(12) United States Patent
James et al.

(10) Patent No.: US 12,370,527 B2
(45) Date of Patent: Jul. 29, 2025

(54) SYSTEMS AND METHODS OF REGENERATING ACTIVATED CARBON

(71) Applicant: Revive Environmental Technology, LLC, Columbus, OH (US)

(72) Inventors: Ryan R. James, Columbus, OH (US); Kavitha Dasu, Powell, OH (US); Dinusha Siriwardena, Columbus, OH (US); Franco Pala, Rockland, MA (US); Ramona Darlington Iery, Columbus, OH (US)

(73) Assignee: Revive Environmental Technology, LLC, Columbus, OH (US)

( * ) Notice: Subject to any disclaimer, the term of this patent is extended or adjusted under 35 U.S.C. 154(b) by 413 days.

(21) Appl. No.: 16/830,210

(22) Filed: Mar. 25, 2020

(65) Prior Publication Data
US 2020/0306726 A1   Oct. 1, 2020

Related U.S. Application Data

(60) Provisional application No. 62/823,570, filed on Mar. 25, 2019.

(51) Int. Cl.
| | |
|---|---|
| *B01J 20/34* | (2006.01) |
| *B01J 20/20* | (2006.01) |
| *B01J 20/30* | (2006.01) |
| *C02F 1/28* | (2023.01) |
| *C02F 101/36* | (2006.01) |
| *C02F 103/06* | (2006.01) |

(52) U.S. Cl.
CPC ........... *B01J 20/3475* (2013.01); *B01J 20/20* (2013.01); *B01J 20/3028* (2013.01); *B01J 20/3416* (2013.01); *C02F 1/283* (2013.01); *C02F 2101/36* (2013.01); *C02F 2101/40* (2013.01); *C02F 2103/06* (2013.01); *C02F 2303/16* (2013.01)

(58) Field of Classification Search
CPC .................................................. B01J 20/3475
See application file for complete search history.

(56) References Cited

U.S. PATENT DOCUMENTS

| | | | |
|---|---|---|---|
| 3,720,626 A | 3/1973 | Benzaria et al. | |
| 4,369,168 A | 1/1983 | Wells et al. | |
| 6,423,657 B1 | 7/2002 | Wang | |
| 7,018,541 B2* | 3/2006 | Hintzer | C02F 1/583 |
| | | | 210/915 |
| 10,287,185 B2 | 5/2019 | Nickelsen et al. | |
| 10,695,709 B2 | 6/2020 | Bishop et al. | |
| 10,913,668 B2 | 2/2021 | Nickelsen et al. | |
| 2005/0173347 A1 | 8/2005 | Hintzer et al. | |
| 2008/0286193 A1 | 11/2008 | Bento et al. | |
| 2008/0317552 A1* | 12/2008 | Luthy | B09C 1/08 |
| | | | 405/128.7 |
| 2019/0017983 A1 | 1/2019 | Smith | |
| 2020/0316560 A1 | 10/2020 | Distefano et al. | |

FOREIGN PATENT DOCUMENTS

FR        1409050 A       8/1965

OTHER PUBLICATIONS

Xiao et al., "Sorption of Poly- and Perfluoroalkyl Substances (PFASs) Relevant to Aqueous Film-Forming Foam (AFFF)-Impacted Groundwater by Biochars and Activated Carbon", Environ. Sci. Technol. 2017, 51, 6342-6351.
Zhi et al., "Adsorption of perfluoroalkyl acids by carbonaceous adsorbents: Effect of carbon surface chemistry", Environ. Pollut. 2015, 202, 168-176, Elsevier Ltd.
Deng et al., "Enhanced adsorption of perfluorooctane sulfonate and perfluorooctanoate by bamboo-derived granular activated carbon", J. Hazard. Mater., 2014, Elsevier B.V.
Falk et al., "Removal of perfluorinated surfactants from wastewater by adsorption and ion exchange - Influence of material properties, sorption mechanism and modeling", Journal of Environmental Sciences, 2016, vol. 54, pp. 160-170, Elsevier B.V.
Chularueangaksorn et al., "Regeneration and reusability of anion exchange resin used in perfluorooctane sulfonate removal by batch experiments", J. Appl. Polym. Sci., 2013, vol. 130, No. 2, pp. 884-890, Wiley Online Library.
International Search Report and Written Opinion for International Application No. PCT/US2020/024774, mailed Jul. 3, 2020.
Bartlett et al., "Evaluating PFAS cross contamination issues", Remediation, 2018;28:53-57, Wiley Periodicals, Inc.
Liang et al., "Electrochemical oxidation of PFOA and PFOS in concentrated waste streams", Remediation. 2018;28:127-134, Wiley Periodicals, Inc.
Ross et al., "A review of emerging technologies for remediation of PFASs", Remediation. 2018;28:101-126, Wiley Periodicals, Inc.
Brochure, "Surface Active Foam Fractionation", OPEC Systems, Enviro Division, Belrose, NSW.
Patterson et al., "Effectiveness of point-of-use/point-of-entry systems to remove per- and polyfluoroalkyl substances from drinking water", AWWA Wat Sci. 2019;e1131, Wiley Periodicals, Inc.
Machine translation of the description of French Patent No. FR1,409,050.
Office Action in Japanese Patent Application JP2021557084A dated Nov. 22, 2023.
Translation of Office Action in Japanese Patent Application JP2021557084A dated Nov. 22, 2023.
Office Action in Korean Patent Application No. 10-2021-7031508 dated Jan. 13, 2025.
Translation of Office Action in Korean Patent Application No. 10-2021-7031508 dated Jan. 13, 2025.
Office Action in Canadian Patent Application No. 3,133,644 Feb. 21, 2025.

* cited by examiner

*Primary Examiner* — Stuart L Hendrickson
(74) *Attorney, Agent, or Firm* — Frank Rosenberg (57) ABSTRACT

The invention provides methods for regenerating activated carbon that have been used in absorbing per- and polyfluoroalkyl substances (PFAS) in aqueous solution. In these methods, the activated carbon is treated with a solution of base in alcohol, which has been found to impart superior properties to the activated carbon.

20 Claims, 10 Drawing Sheets

SYSTEMS AND METHODS OF REGENERATING ACTIVATED CARBON

RELATED APPLICATIONS

This application claims the priority benefit of U.S. Provisional Patent Application No. 62/823,570 filed Mar. 25, 2019.

INTRODUCTION

Per- and polyfluoroalkyl substances (PFAS), including perfluorooctane sulfonate (PFOS) and perfluorooctanoic acid (PFOA), and hundreds of other similar compounds, have been widely used in the United States in a multitude of applications, and there are significant associated concerns due to widespread contamination coupled with uncertainties about risks to human health and the environment. Although some PFAS compounds with known human health risks have been voluntarily phased out (PFOA and PFOS), legacy contamination remains. Additional replacement PFAS compounds have been introduced with limited understanding of their health risks. Currently, only PFOA and PFOS are addressed in Lifetime Health Advisories at the Federal level, with no established maximum contaminant level (MCL) to regulate the acceptable level of these and other PFAS compounds in drinking water. In the United States, no PFAS chemicals have been listed as hazardous substances to date, which would enact a requirement under the CERLCA process to monitor and regulate PFAS contamination in water, soil, and sediment. In the current absence of federal regulation, most exposure assessments and mitigations are limited to identifying the presence of PFAS in soil and groundwater and treating drinking water.

The use of activated carbon to absorb PFAS from water has been studied by numerous groups. See, for example, Xiao, X.; Ulrich, B. A.; Chen, B.; Higgins, C. P. Sorption of Poly- and Perfluoroalkyl Substances (PFASs) Relevant to Aqueous Film-Forming Foam (AFFF)-Impacted Groundwater by Biochars and Activated Carbon. Environ. Sci. Technol. 2017, 51, 6342-6351 and Zhi, Y. and Liu, J., Adsorption of perfluoroalkyl acids by carbonaceous adsorbents: Effect of carbon surface chemistry. Environ. Pollut. 2015, 202, 168-176.

SUMMARY OF THE INVENTION

In a first aspect, the invention provides a method of regenerating activated carbon contaminated by polyfluoroalkyl substances (PFAS) and/or perfluorooctane sulfonate (PFOS), comprising: providing activated carbon having adsorbed polyfluoroalkyl substances (PFAS) and/or perfluorooctane sulfonate (PFOS); contacting the activated carbon in a solution that comprises at least 50 mass % alcohol and at least 0.2 mass % of a base; and separating the activated carbon from the solution.

In another aspect, the invention provides a method of regenerating activated carbon contaminated by polyfluoroalkyl substances (PFAS) and/or perfluorooctane sulfonate (PFOS), comprising: providing activated carbon having adsorbed polyfluoroalkyl substances (PFAS) and/or perfluorooctane sulfonate (PFOS); contacting the activated carbon in a solution that comprises at least 50 mass % alcohol and at least 0.5 mass % of a base; and separating the activated carbon from the solution.

Any of the inventive aspects can, in various embodiments, be further characterized by one or any combination of the following features: rinsing the activated carbon that has been separated from the solution; wherein the step of contacting is conducted for at least 1 minute or at least 2 minutes, or at least 10 minutes, or at least 100 minutes, or 1 to 1000 minutes; the contacting step can be a batch process, or, more preferably, a flow through process; wherein the resulting activated carbon possesses about the same or superior adsorption of PFOS and/or PFOA (as measured by the sorption method in the Examples) as compared with the virgin activated carbon (see FIGS. 3 and 4); wherein the resulting activated carbon possesses superior adsorption (or desorption) of PFOS and/or PFOA (as measured by the sorption method in the Examples) as compared with the virgin activated carbon after exposure to PFAS for 2 days; wherein the resulting activated carbon possesses about the same or superior desorption of PFOS and/or PFOA (as measured by the sorption method in the Examples) as compared with the virgin activated carbon; wherein the resulting activated carbon possesses superior desorption of PFOS and/or PFOA (as measured by the sorption method in the Examples) as compared with the virgin activated carbon after exposure to PFAS for 2 days (the term virgin refers to activated carbon as received from the manufacturer without exposure to regeneration treatment); wherein the solution that is separated from the activated carbon is distilled to produce an alcohol solution that is recycled and used again regenerate activated carbon, preferably at the same site; wherein the step of contacting comprises immersion, rinsing, and/or spraying; wherein the step of contacting comprises rinsing at least 3 times with a volume of solution that is at least equal to the volume of activated carbon (preferably, there is at least 2 minutes between each rinse); wherein the solution comprises at least 60, 70, 80, 90, or at least 95% mass % alcohol; wherein the alcohol is selected from methanol, ethanol, propanol and combinations thereof; wherein the activated carbon is granulated activated carbon derived from coal; wherein the activated carbon is granulated activated carbon that has been disposed underground and exposed to groundwater comprising PFAS; wherein the activated carbon is regenerated in a flow of the alcohol and base solution.

The invention also includes a method of removing PFAS from PFAS-contaminated water comprising passing the PFAS-contaminated water through activated carbon to form PFAS-contaminated activated carbon and, subsequently, regenerating the PFAS-contaminated carbon using any of the methods described herein. The invention also includes activated carbon that has been regenerated by any of the methods.

In a further aspect, the invention provides a system for regenerating activated carbon, comprising: a vessel comprising activated carbon having an inlet and an outlet; and a distillation column connected to the outlet of the vessel; and wherein an alcohol solution comprising at least 0.2 mass % or at least 0.5 mass % base is present in the system.

Any of the methods or systems can be characterized by the measured properties described in the Examples section. As described in the Examples, it was surprisingly discovered that the regenerated activated carbon performed significantly better than the virgin GAC. In preferred embodiments, the regenerated activated carbon has at least 10% (or at least 20%, or up to the performance shown in the Examples) greater desorption of PFOA or PFOS under identical conditions or under the conditions described in the Examples as compared with virgin activated carbon. The percentages are relative to virgin GAC rather than an absolute value based on the total amount of adsorbed PFOA or PFOS.

DETAILED DESCRIPTION OF THE INVENTION

Figure 1:
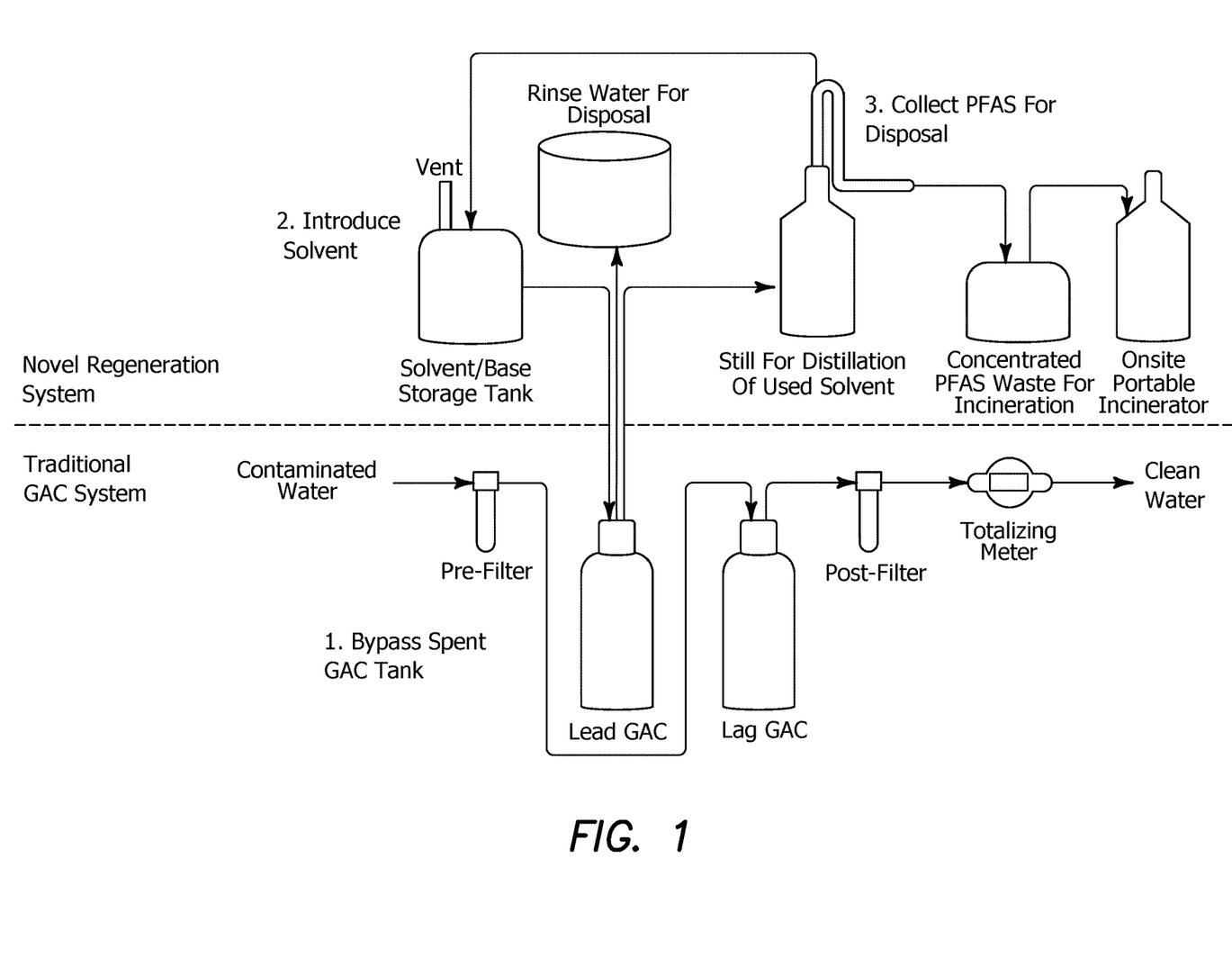
FIG. 1 schematically illustrates an integrated system for regenerating PFAS-contaminated activated carbon that can be at a site where PFAS is removed from water.

The system shown in FIG. 1 illustrates a system for removing PFAS from contaminated water. Unlike conventional systems, the activated carbon is regenerated on site. Contaminated water is run through activated carbon. The activated carbon absorbs PFAS and relatively clean water exits the activated carbon. A vessel containing contaminated activated carbon can be taken off line (optionally while treatment continues in another activated carbon-containing vessel) and the contaminated activated carbon contacted with solution that extracts the PFAS from the activated carbon, the PFAS-containing solution is removed leaving regenerated activated carbon that can again be used to treat PFAS-contaminated water. The PFAS-containing solution can be transferred to another vessel where the PFAS is separated from the solution, such as by distillation. The solution can then be used again to extract PFAS from contaminated activated carbon. Optionally, the PFAS can be destroyed at the site (such as by incineration or other destruction procedure) in the appropriate destruction apparatus or shipped away for additional treatment.

PFAS are molecules having chains of carbon atoms surrounded by fluorine atoms. The C—F bond is very stable and the compounds persist in the natural environment. Some PFAS include hydrogen, sulfur, and/or nitrogen atoms.

Activated carbon is often used for adsorption of PFAS in aqueous solutions. A practical problem with the use of activated carbon for the characterization and remediation of such solutions is that the activated carbon must be treated to remove the adsorbed PFAS and/or PFOS.

Conventionally, it is necessary to ship the activated carbon to a treatment facility, which is an expensive and cumbersome. Battelle has invented a novel technology that will reduce activated carbon regeneration and replacement costs. Experiments and data supporting the technology's effectiveness is shown below in the Examples section.

Activated carbon is a form of porous carbon that has a high surface area for good adsorptive properties; typically a surface area of at least 100 $m^2/g$, or at least 200 $m^2/g$, or at least 300 $m^2/g$, in some embodiments, in range of 200 to 1000 $m^2/g$ as determined by Brunauer. Emmett and Teller (BET) analysis. Preferably, the activated carbon is in the form of granulated activated carbon (GAC) and has a size (as determined by sieving) of at least 0.1 mm, or at least 0.2 mm, or in the range of 0.1 to 2.0 mm, or 0.2 to 1.0 mm, or between 8 and 40 mesh size, US Standard Mesh Size No. (at least 85 mass % in the defined range for any of these ranges). One preferred source for the activated carbon is from coal.

Alcohols used in the present invention are not limited in the broader aspects; however, methanol, ethanol, and isopropanol are preferred, in part in view of their relatively low cost and relatively low boiling point, with ethanol and isopropanol being more preferred. Higher molecular weight alcohols will be suitable. The alcohol can be of a single type (for example, at least 90 mass % or at least 95% of one alcohol), or may be a mixture of alcohols. The solution for regenerating the activated carbon, contains at least 50 mass % alcohol(s) or at least 80% or at least 90%, or at least 95 mass % alcohol.

The solution for regenerating the activated carbon comprises at least 0.2 mass %, or at least 0.3 mass %, or at least 0.5 mass % of a base, in some embodiments in the range of 0.2 to 5 mass %, or 0.3 to 2 mass %, or 0.2 to 0.8 mass %, or 0.3 to 0.7 mass %, or 0.5 to 5 mass %, or 0.5 to 2 mass %, or 0.8 to 1.2 mass %. Preferred bases include ammonia (NH3), NaOH, triethylamine, and ethanolamine. Surprisingly, we found that the regenerated activated carbon possessed superior efficiency for adsorption and/or desorption of PFASs and/or PFOS in aqueous solutions.

Although it is possible to regenerate activated carbon in a batch process; it is preferred to regenerate in a flow-through process is which the alcohol/base solution is passed through the activated carbon. In some preferred embodiments, the volume of regenerating solution (primarily or solely consisting of alcohol plus base) to mass of activated carbon, during the PFAS desorption step is at least 2 mL/g in the range of 2 to 100, or 5 to 50, or 6 to 20, or up to about 10 mL/g. Regeneration treatments (prior to distillation) can typically be conducted at ambient temperature and pressure.

Optionally, following regeneration, the activated carbon could be subjected to a drying step. For example, an air stream can be passed through the regenerated activated carbon.

Examples in which the inventive activated carbon regeneration can be employed include:

Regeneration of activated carbon from an onsite system (see FIG. 1) where the activated carbon is included in vessels that are permanently or semi-permanently affixed at the site and water (for example, drinking water) treatment is performed onsite and the PFAS in the PFAS concentrate is incinerated (or otherwise destroyed) onsite or hauled via tanker truck to a disposal location;

Regeneration of activated carbon using a trailer mounted system where the GAC is included in vessels that are transported to the site of water treatment and water treatment is performed onsite and the PFAS concentrate;

Regeneration of activated carbon used in passive sampling devices that can be regenerated for repeat use as groundwater, drinking water, or air sampling;

Regeneration of activated carbon used as a PlumeStop™;

Regeneration of activated carbon used in groundwater site remediation/GAC treatment/pretreatment;

Regeneration of activated carbon used in any environment remediation application where activated carbon has the potential to become saturated with PFAS and other mixed contaminants and requires release of those chemicals for continued remediation effectiveness; potentially being regenerated after adsorbing PFAS and other contaminants after 100 days, one year or more (for example, up to 5 years or up to 10 years) of in-situ placement as a soil coating.

The invention includes methods including one or more of these steps. The invention also includes systems comprising any of the components and compositions described anywhere in this application. For example, the invention includes the regeneration system including solutions for removing PFAS and regenerating activated carbon.

EXAMPLES

Virgin bituminous coal-based granulated activated carbon (GAC) (Filtrasorb 400 (F400), CalgonCarbon Corporation, Pittsburgh, PA USA) was used for the sorption kinetic experiments. The GAC has a surface area of 947.8 $m^2/g$, a pore volume of 0.58 ml/G and log Kd values for PFOA and PFOS of 6.01 and 6.44 L/Kg provided by the manufacturer.

First Experimental Set

Step 1—Bulk PFAS Contamination of Virgin GAC (to Simulate Spent GAC from a Field Treatment Unit)

F-400 GAC was used for all the experiments. Initially, 100 g of GAC was weighed and added to a 1 L HDPE bottle containing 0.8 L of PFOA and PFOS aqueous solution (initial concentration of 500 ug/L). The sample was shaken on an end over end table top rotating shaker for 20 days. After sampling on Day 20, the aqueous solution was decanted into another container and the GAC was air dried under vacuum for overnight and the resultant dry PFOA and PFOS contaminated GAC was used for the GAC regeneration experiments.

Step 2—Column Regeneration of PFAS Contaminated GAC

Figure 2:
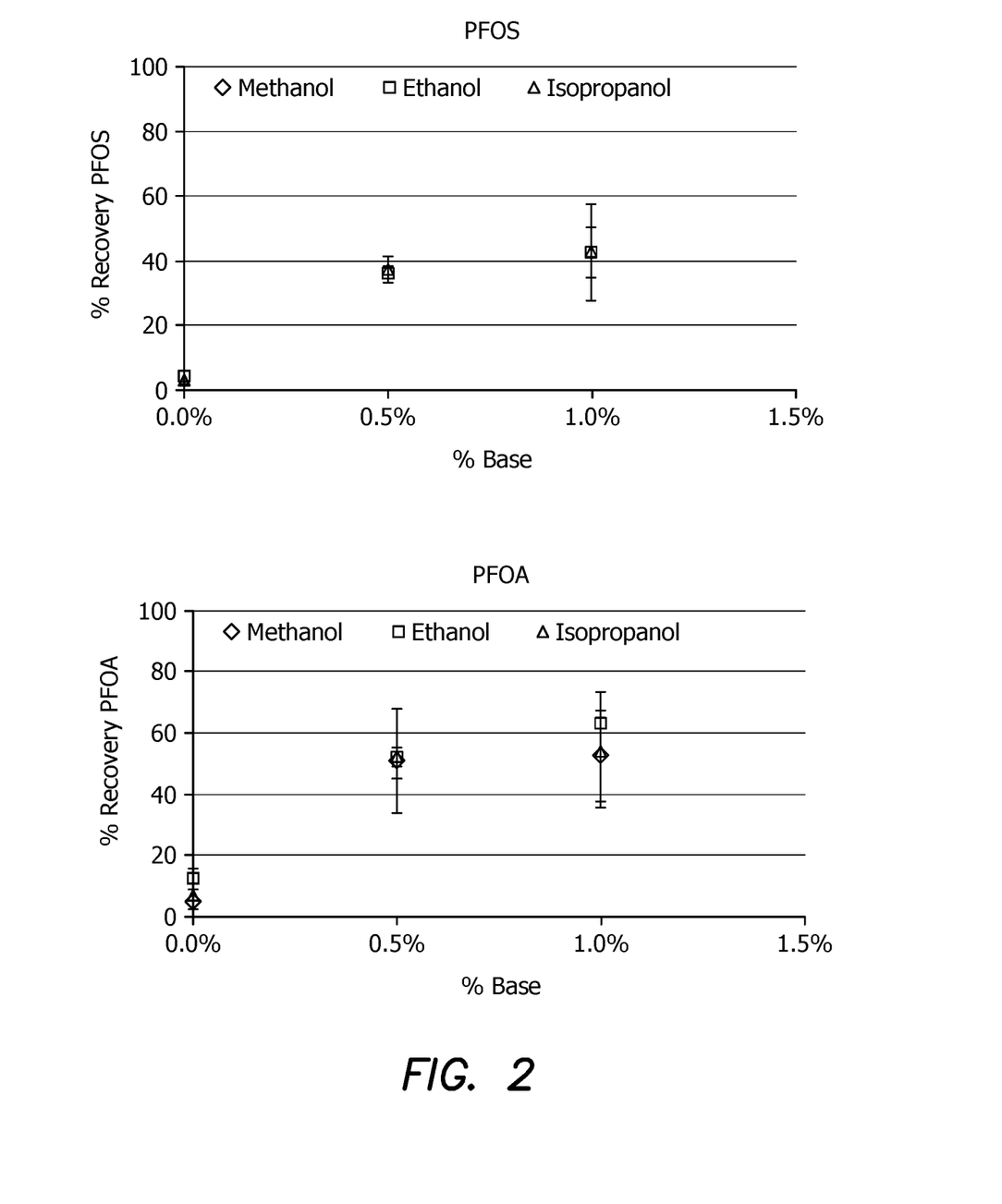
FIG. 2 shows removal of PFOS and PFOA using various amounts of base in methanol, ethanol and isopropanol.

Through laboratory studies, Battelle has determined a solvent class that can be used to regenerate GAC that has been contaminated with PFAS. To achieve the regeneration, 1 g GAC was placed in columns, 5 mL of solvent was added, a 2 min contact time was performed, then the valve was opened to allow drop by drop flow of the solvent over 2-10 minutes. Three such elutions for each sample were collected separately. All elutes were centrifuged at 3500 rpm for 10 min and refrigerated until analysis. These experiments were performed with base concentrations of 0, 0.5%, and 1% ammonia (base). FIG. 2 shows that the recovery with 1% base. Regeneration experiments were done at ambient temperature, with no stirring, and use of a fixed bed of GAC.

Step 3—Comparison of Uptake of Virgin and Regenerated GAC

Step 3A: Sorption Kinetic Experiment of PFAS Adsorption onto Virgin GAC

The experiments were conducted in triplicate 50-mL PP centrifuge tubes with an initial PFOS or PFOA concentration of 150 µg $L^{-1}$ (500 uL of 15 ppm stock solution is added). Sorbent to solution ratio of 5.0 mg:50 mL, using 0.01 M NaCl as a background electrolyte. Another set of duplicate 50-mL PP centrifuge tubes containing only 50 mL of 0.01 M NaCl solution (No GAC) spiked with PFOA/PFOS (initial concentration of 150 µg $L^{-1}$) are used as controls. A duplicate sample of 50-mL PP centrifuge tubes containing only 50 mL of 0.01 M NaCl solution and GAC are sampled as blanks at day 0. All the samples are rotated on an orbital shaker, at room temperature (record the temperature) and ~50 rpm or adjusted for proper mixing and maintained at pH 7.0. Sampling was done at day 0, 2, 5, 12, and 20. At each sampling time, centrifuge tubes containing the test solutions at 5000 g for 15 min, and then 0.25 mL of supernatant was sampled and diluted with 0.25 mL methanol into an Eppendorf tube (polypropylene/polyethylene) and sent to analytical lab for sample analysis.

Analytical Lab:

Before analysis, vortex the sample and centrifuge at 10,000 g for 10 min to remove very fine suspended materials. From the supernatant, 100 uL of the sample was taken in to HPLC vial and after adding internal standard, the sample is diluted to a total volume of 500 uL using 80/20 Methanol/water (v/v) and analyzed on liquid chromatography tandem mass spectrometry (LC-MS/MS).

Results and Discussion

Removal of PFOA and PFOS from Lab Contaminated GAC.

As shown in Table 1 and FIG. 2, initial isotherm experiments demonstrate that the three alcohol solvents provide similar removal of PFOS and PFOA from laboratory-contaminated GAC regardless of whether or not the alkaline additive was included in the regenerate solvent. For each alcohol with no base additive, the average PFOA and PFOS recoveries into the regenerant solvent were 12% or less with mostly overlapping standard deviation indicating they were not significantly different from one another. For the alcohols with 0.5% and 1.0% base additive, the PFOA recoveries (54%±4%) were higher than the PFOS (35%±7%), but there was no significant difference between the recoveries when the bases were at 0.5% or 1.0%.

TABLE 1

Initial Selection of Regenerate Solution for PFOA and PFOS

| Solvent | 0.0% | 0.5% | 1.0% |
|---|---|---|---|
| PFOA % recoveries* | | | |
| Methanol | 5 ± 2 | 51 ± 17 | 52 ± 15 |
| Ethanol | 12 ± 4 | 52 ± 3 | 63 ± 11 |
| Isopropanol | 7 ± 1 | 53 ± 7 | 54 ± 19 |
| PFOS % recoveries* | | | |
| Methanol | 1 ± 1 | 24 ± 6 | 3 ± 11 |
| Ethanol | 4 ± 1 | 36 ± 3 | 42 ± 8 |
| Isopropanol | 3 ± 0.2 | 37 ± 4 | 43 ± 15 |

Sorption Kinetic Experiment of PFAS Adsorption onto Virgin and Regenerated GAC.

Figure 3:
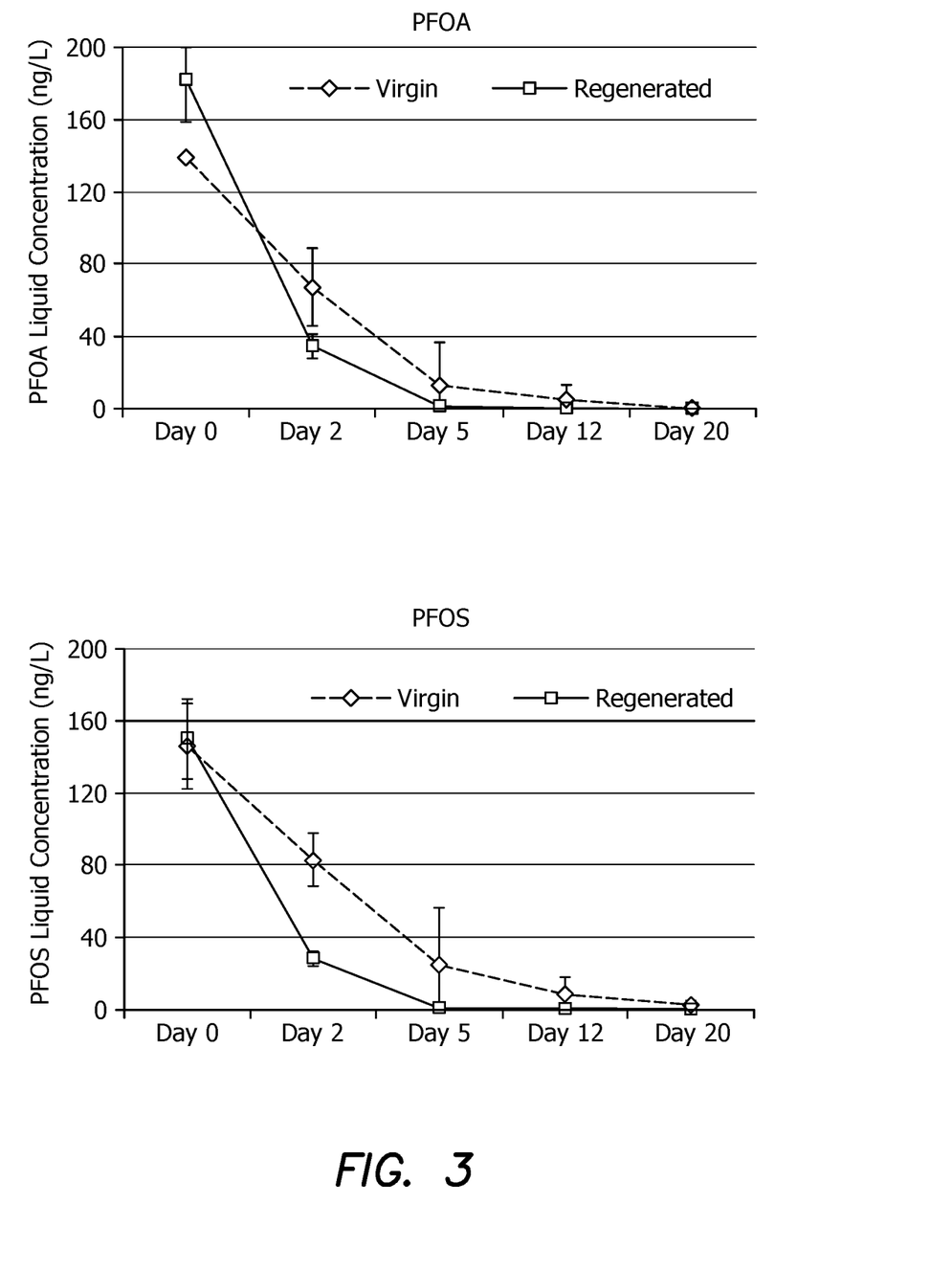
FIG. 3 shows kinetic sorption results for PFAS adsorption onto virgin and regenerated GAC (based on liquid PFAS concentration over time).
Figure 4:
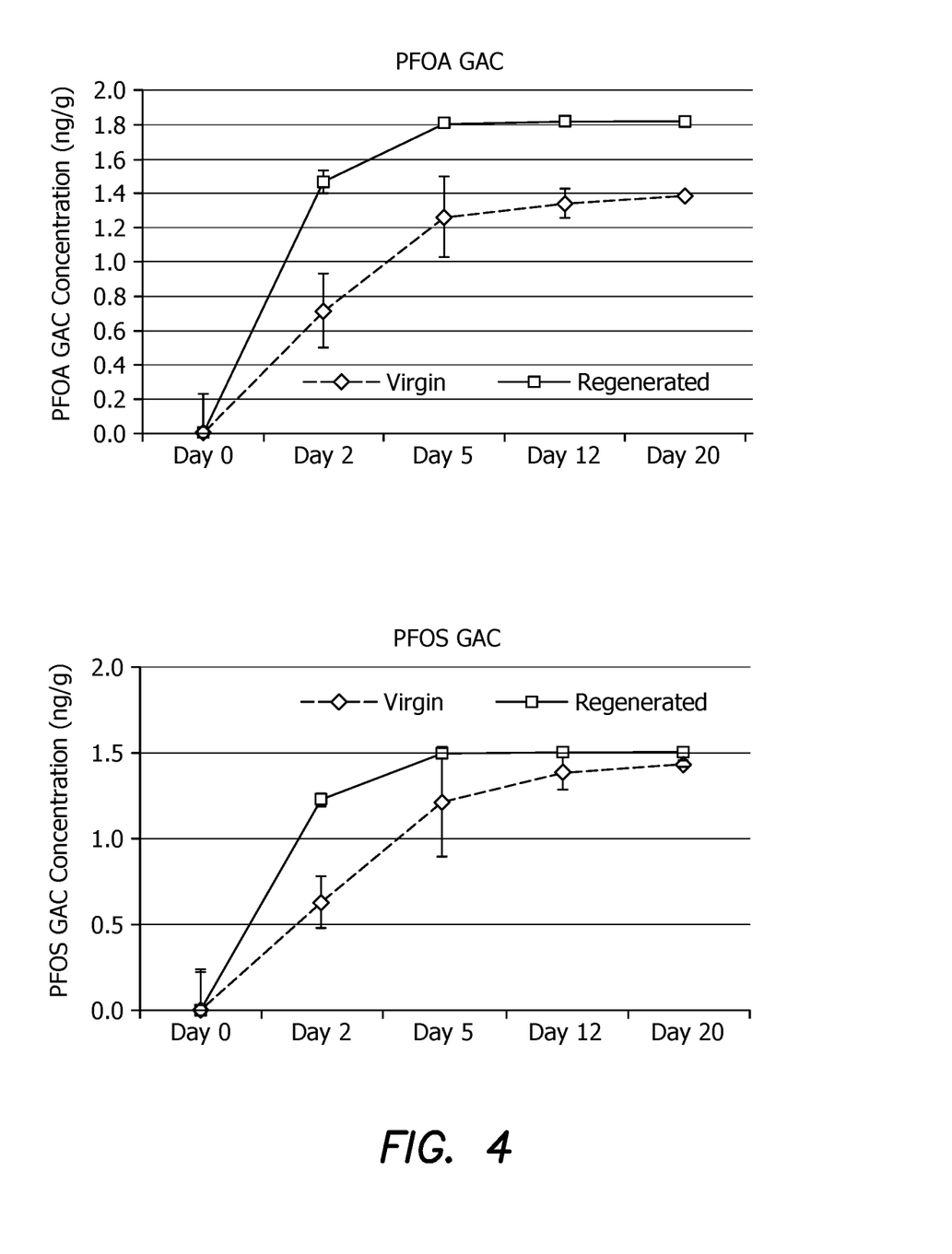
FIG. 4 shows kinetic sorption results for PFAS adsorption onto virgin and regenerated GAC (based on GAC concentration over time).

Following selection of an optimal regenerant solution, a sorption kinetic experiment was conducted to determine the PFAS adsorption onto virgin and regenerated GAC. FIG. 3 shows the result of this experiment where all of the PFOA and PFOS had adsorbed to the GAC within 20 days of initial exposure. This result was found to be true for both GAC that had never been used before (virgin) and GAC that had been regenerated once as described above. The average concentrations measured in the aqueous phase indicate the that the rate of adsorption was very similar for both the virgin and the regenerated GAC. FIG. 4 shows the result of this experiment with the concentration of PFOA and PFOS on the GAC, thus an increasing concentration over time compared to the decreasing experiment over time in the results of the aqueous concentration of PFOA and PFOS. The PFOA results in Figure CC suggest that there may be an increased adsorption capacity for the regenerated GAC compared to the virgin GAC as Day 2 through Day 20 GAC concentrations in the regenerated GAC all have significantly higher GAC concentrations that the corresponding virgin GAC samples. However, for the PFOS results, only the Day 2 samples have a significantly different results making the results less clear.

Scanning electron microscopy energy dispersive spectroscopy (SEM-EDS) was conducted on the GAC to investigate the effect of the desorption on the surface of the GAC. The surface microscopy measurements demonstrated that the spent GAC (containing PFAS) had a surface content of fluorine more than four times the virgin and regenerated GAC. After treatment with the alcohol/base solution the surface weight percent of fluorine of the regenerated GAC had returned to a very low level. Therefore, the process was demonstrated to remove PFAS from the GAC surface to allow for reuse for PFAS removal. In addition, Battelle has also demonstrated the removal of PFAS from field contaminated GAC.

Second Experimental Set

Figure 5:
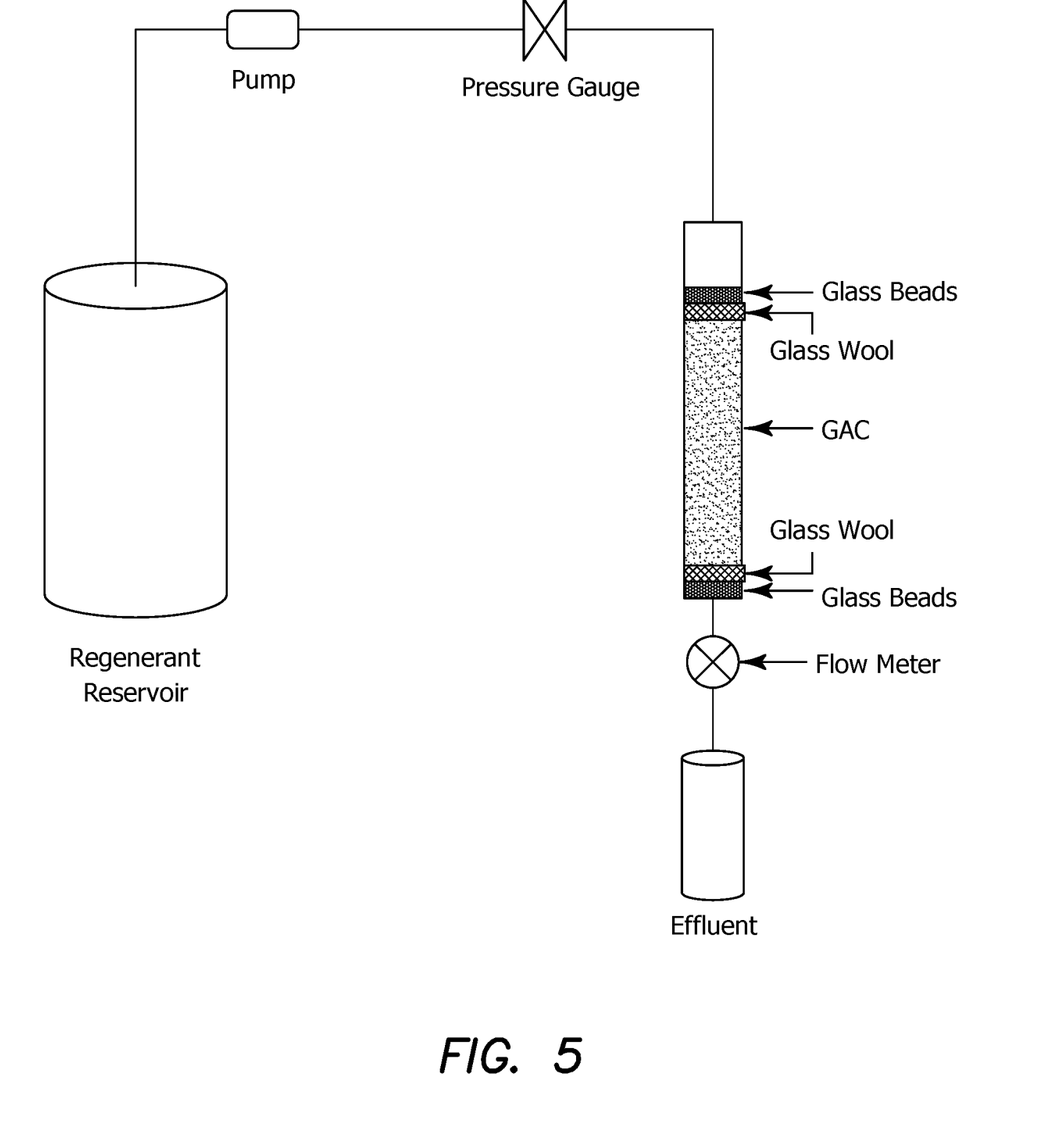
FIG. 5 schematically illustrates apparatus for testing PFAS removal from granulated activated carbon. Regenerate is pumped from the reservoir through a column of GAC sandwiched between layers of wool.
Figure 6:
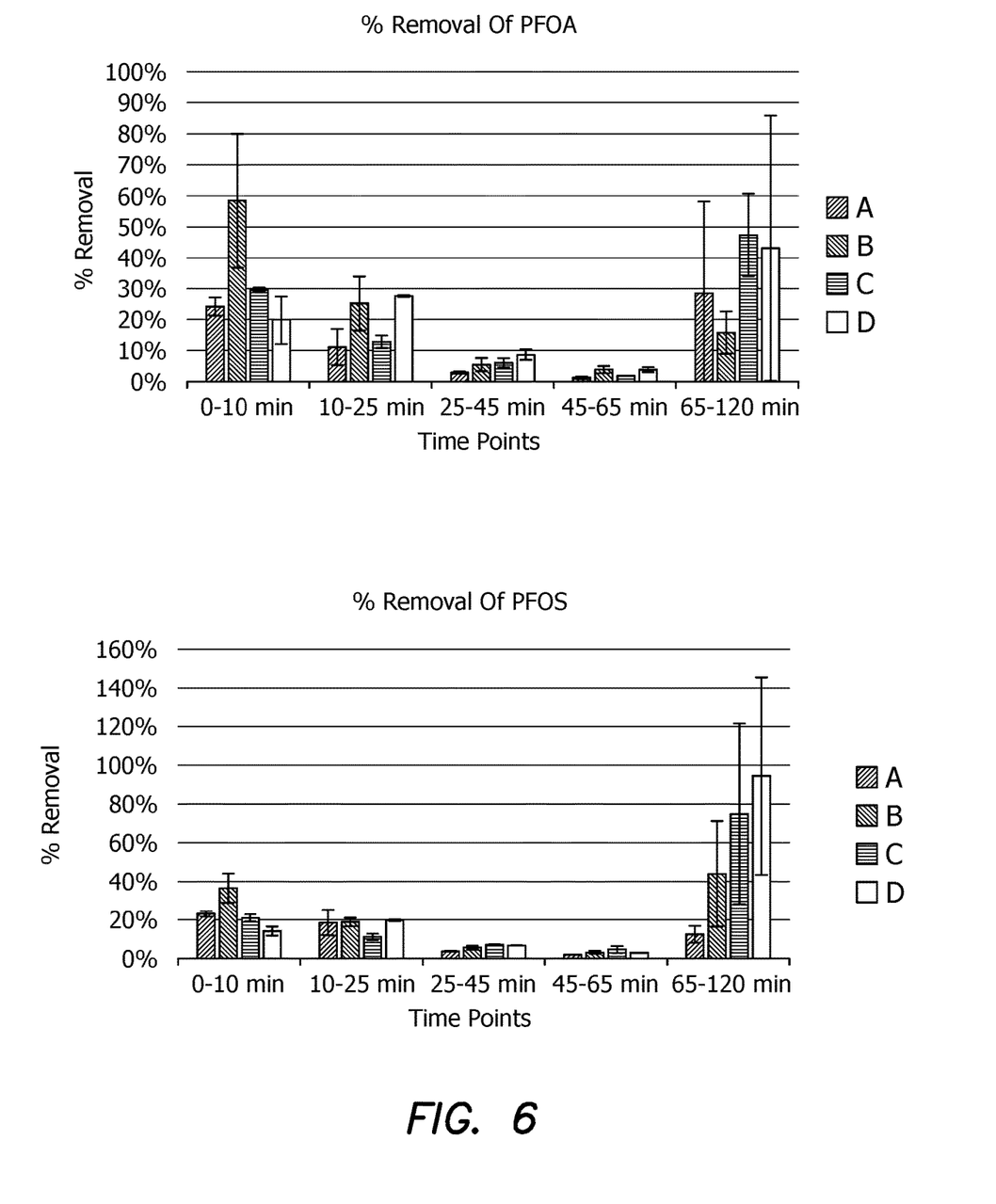
FIG. 6 shows the percent removal of PFOA (top) and PFOS (bottom) at different time points for the second set of experimental results.
Figure 7:
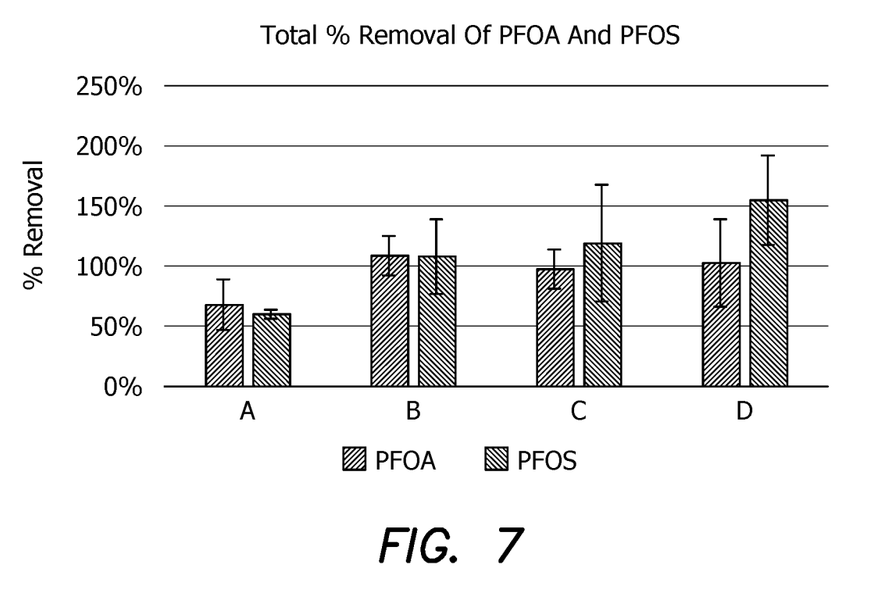
FIG. 7 shows the percent total removal of PFOA and PFOS at the end of the column test.
Figure 8:
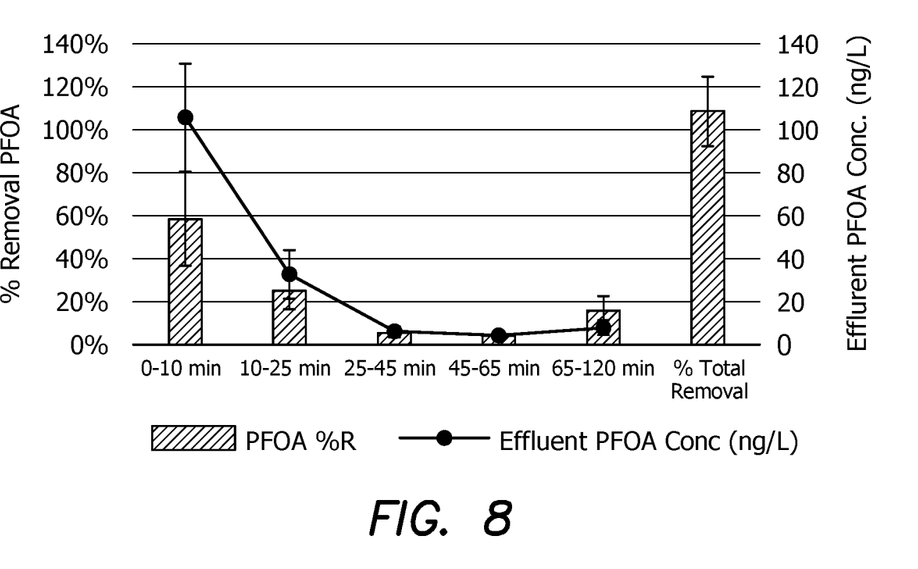
FIG. 8 shows the percent total removal of PFOA with effluent concentrations.
Figure 9:
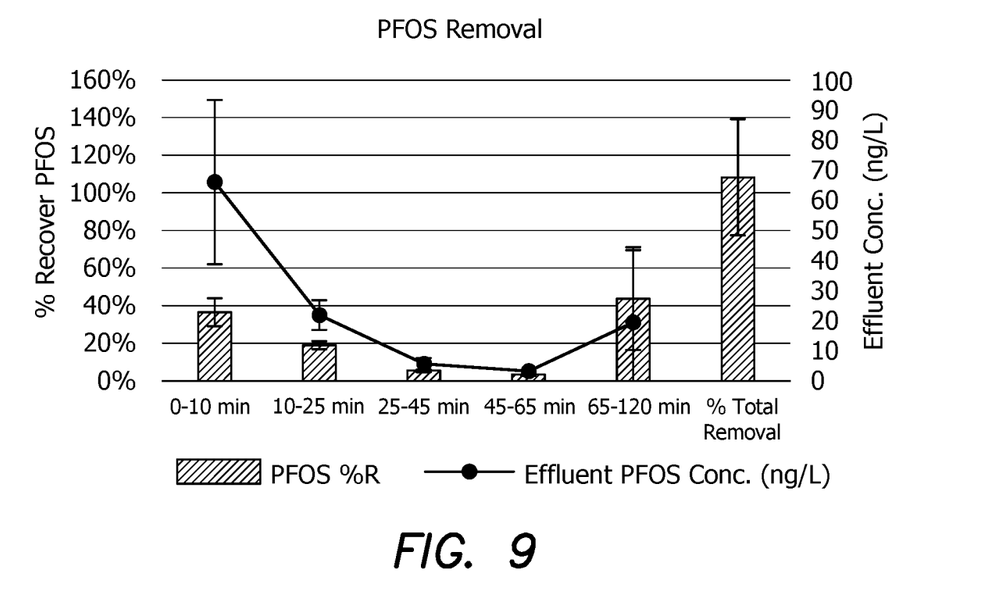
FIG. 9 shows the percent total removal of PFOS with effluent concentrations.

GAC Regeneration—Rapid Small-Scale Column Testing (RSSCT) to Further Identify Regenerant Solvent and Additive Ratios To select the best PFAS removal solvent and additive composition, rapid small-scale column testing (RSSCT), which is based on standard method ASTM D6586 was used as shown in FIG. 5. This standard method provides an outline for a RSSCT method for the evaluation of regenerated GAC for the adsorption of soluble PFAS from water.

Materials:

Column test were carried out in Flex-Column®, Kimble, constructed of a borosilicate glass barrel, with removable polypropylene caps. Uptake experiments were conducted in high-density polyethylene (HDPE) bottles and samples were collected in HDPE bottle and polypropylene (PP) tubes.

Two perfluoroalkyl acids, including perfluorooctanoic acid (PFOA, $C_8F_{15}HO_2$, 98%) and perfluorooctanesufonic acid (PFOS, $C_8HF_{17}O_3S$, 98%) Sigma-Aldrich Co. Deionized water was used to prepare the reaction solutions. Linear perfluoroalkylcarboxylic acids and sulfonates were purchased from Wellington Laboratories (Guelph ON) and used as analytical standards for LC-MS/MS. They included: perfluoro-n-octanoic acid (PFOA) and perfluoro-n-octanesulfonate (PFOS). $^{13}$C-labeled PFASs were used for quantification (internal) standards consisting perfluoro-1-[1,2,3,4-$^{13}C_4$] octane sulfonate (MPFOS), and perfluoro-n-[1,2,3,4-$^{13}C_4$] octanoic acid (MPFOA). Stock solutions of each individual standard or mixtures supplied by the manufacturer were prepared by diluting the original in methanol (HPLC grade). All the original standards and stock solutions were stored in the refrigerator (~4° C.). All solvents used were HPLC grade.

Analytical Methods:

All samples were analyzed following serial dilution as per the DoD Quality Systems Manual 5.1 Table B-15 criteria for samples of known high PFAS concentrations using LC-MS/MS using negative electrospray mode and the analytes quantified using the isotope dilution method.

GAC Extraction:

Homogenized GAC sample was weighed 2.0 g (+/−0.02 g) into a 50 mL PP tube and fortified with the surrogate internal standard (SIS). Laboratory control samples (LCS), matrix spike (MS), and matrix spike duplicate (MSD) samples were included as required by the method. 13.5 mL of acetonitrile and 1.5 mL of 0.25 M ammonium hydroxide (NaOH) were added to the PP tube, extracted on Geno/Grinder (1,200 RPM for 15 minutes) and centrifuged for 5 minutes at 2,500 RPM. The resulting supernatant was decanted into clean 50 mL PP tube. Then, 2.7 mL of fresh acetonitrile and 0.3 mL of 0.25 M NaOH were added to the sample, extracted on Geno/Grinder and centrifuged with same conditions. The resulting supernatant was added to the previously collected one and same procedure was repeated. To clean up the collected supernatant, 2.7 mL of acetonitrile, 0.3 mL of 0.25 M NaOH and 10 mg of Supelclean ENVI-carb and were added to the 2.1 mL of the extract and Geno/Grinded for 5 minutes at 500 RPM, centrifuge for 5 minutes at 2,500 RPM and decanted supernatant for the analysis.

Column Setup

Five columns, one for each regenerant solution and control, were set up in a fume hood. The columns (Flex-Column®, Kimble, constructed of a borosilicate glass barrel, with removable polypropylene caps and 20 μm porosity HDPE bed supports fixed at the column outlets) had Luer-Lok™ ends to connect tubing. The columns were set up in parallel using a manifold (⅛-inch tubing) and secured to ring stands with clamps. Individual regenerant reservoirs were connected in parallel to columns and experiments were performed simultaneously. For each column, a needle valve was plumbed to control the flowrate and a one-way ⅛-inch check valve was attach to the tubing on the effluent side of the column and measured the flow using flow meter. The influent tubing was connected to a digital gear pump (Cole Parmer, Micro Pump GA Series). A pressure gauge was installed on the influent side of a column. The design criteria for the column are included in Table 2 and the bench scale study design for RSSCTs.

TABLE 2

Design Criteria

| Design Criteria | Parameter |
| --- | --- |
| Column inner diameter | 0.7 centimeter (cm) |
| Column length | 5.0 cm |
| Flow rate | 2.0 milliliters per minute (mL/min) |
| Bed Height | 3.3 cm |
| Bed volume | 1.27 mL |
| Duration of one test | 120 min |
| Empty bed contact time (EBCT) | 0.63 min |

Column Test—Screen Test with Lab Contaminated GAC to Select Best Performing Solvent/Additive System Columns were dry packed with same amount of PFAS Lab contaminated (Spiked) GAC with PFOA and PFOS.

Individual regenerant reservoirs were connected to columns separately and pumped upwards to introduce different regenerant formulations present in Table 2 to the PFAS-laden GAC. Duplicate columns for each of four solvent/additive combinations were set up. Regenerant solutions were run through the columns for 2 hours and samples were collected at 4 different time points (10, 25, 45, and 65, min) for PFAS analysis in 15 mL polypropylene centrifuge tubes. Columns were run for another hour and effluent was collected separately (120 min sample) in 250 ml HDPE bottles. Control columns were also set up with uncontaminated GAC to check the background concentration levels. Samples of each regenerant/rinse water solution were collected, packaged and shipped to Norwell, MA laboratory where PFAS concentrations were measured to determine the relative effectiveness of each regenerant solution. Lab contaminated GAC, before and after treatment also sent to extraction and analysis to find out the amount of PFAS adsorbed.

TABLE 3

Solvent and additive ratio

| No | Solvent Ethanol (EtOH) Isopropyl alcohol (IPA) | Additive Ammonium Hydroxide ($NH_4OH$) (V/V) |
|---|---|---|
| A | EtOH | 1.0% |
| B | EtOH | 0.5% |
| C | IPA | 1.0% |
| D | IPA | 0.5% |

Results: Removal of PFOA and PFOS from Lab Contaminated GAC

Ethanol and 0.5% $NH_4OH$ was selected as the solvent system because of the increased removal (>85%) at 0-10 min with ethanol. Large contributions of PFOA/PFOS at 65-120 min elution less of a concern because of the large error bars around those measurements as well as the relatively low concentration in the effluent samples (which increase the relative uncertainty of the propagated error). Mass balance of this solvent optimization experiment reveals ~100% mass balance (when using nominal pretreatment PFOA/PFOS concentrations); 120-130% when measured GAC extraction concentrations are used.

TABLE 4

PFOA and PFOS mass balance in screen test

| Solvent/ Additive System | Pre-Treatment GAC (nmol) | After-Treatment GAC (nmol) | Effluent (nmol) | After treat + Effluent (nmol) | Mass Balance |
|---|---|---|---|---|---|
| PFOA | | | | | |
| A | 8.69 | 0.48 | 4.91 | 5.40 | 62% |
| B | 8.69 | 0.94 | 7.87 | 8.81 | 101% |
| C | 8.69 | 0.83 | 7.06 | 7.89 | 91% |
| D | 8.69 | 0.76 | 6.87 | 7.62 | 88% |
| PFOS | | | | | |
| A | 7.20 | 0.94 | 3.20 | 4.14 | 57% |
| B | 7.20 | 1.26 | 5.75 | 7.01 | 97% |
| C | 7.20 | 1.23 | 6.34 | 7.57 | 105% |
| D | 7.20 | 1.09 | 8.24 | 9.33 | 130% |

Results: Uptake Testing to Evaluate the Adsorption of Virgin GAC and Regenerated GAC.

Figure 10:
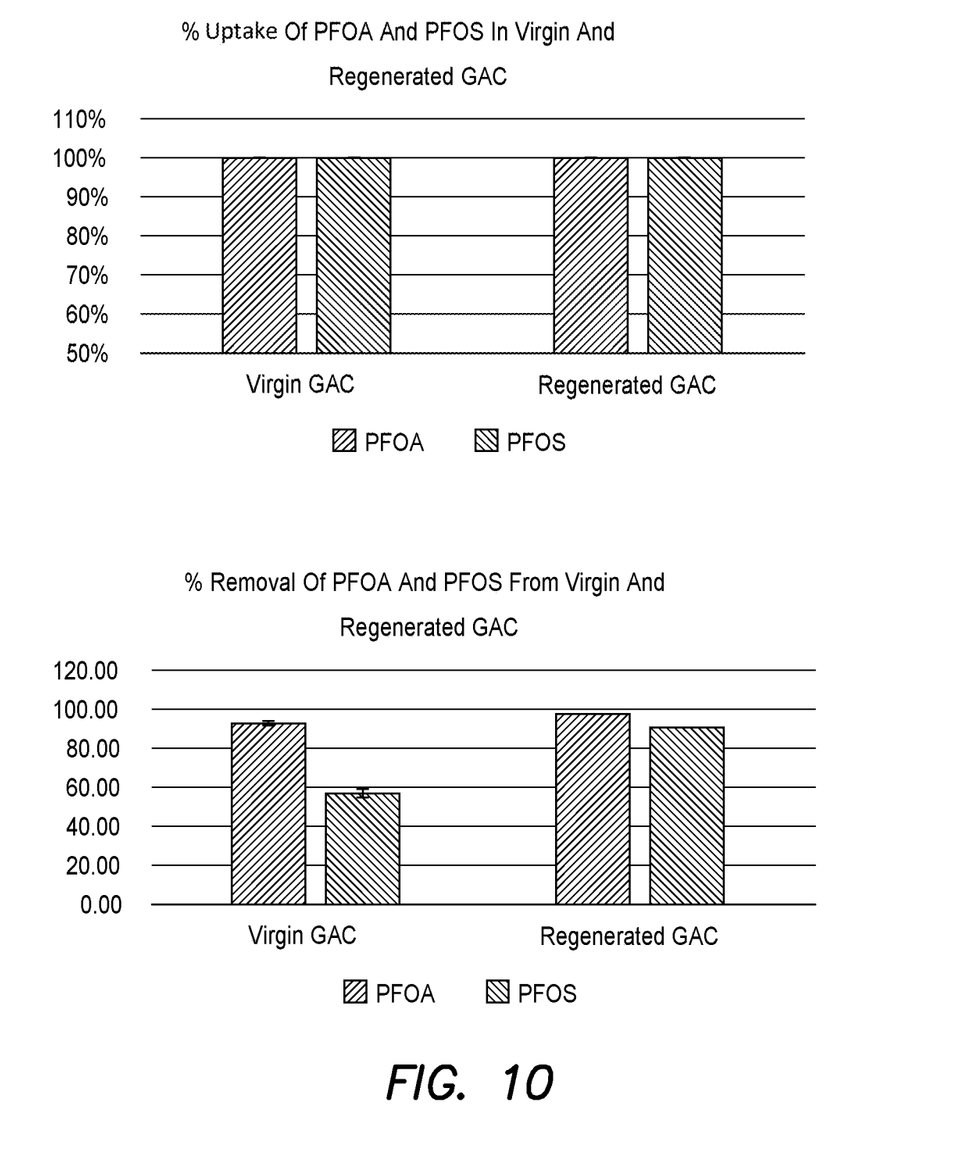
FIG. 10 shows the percent total of the uptake and removal of PFOA and PFOS in Virgin and Regenerated GAC.
Figure 11:
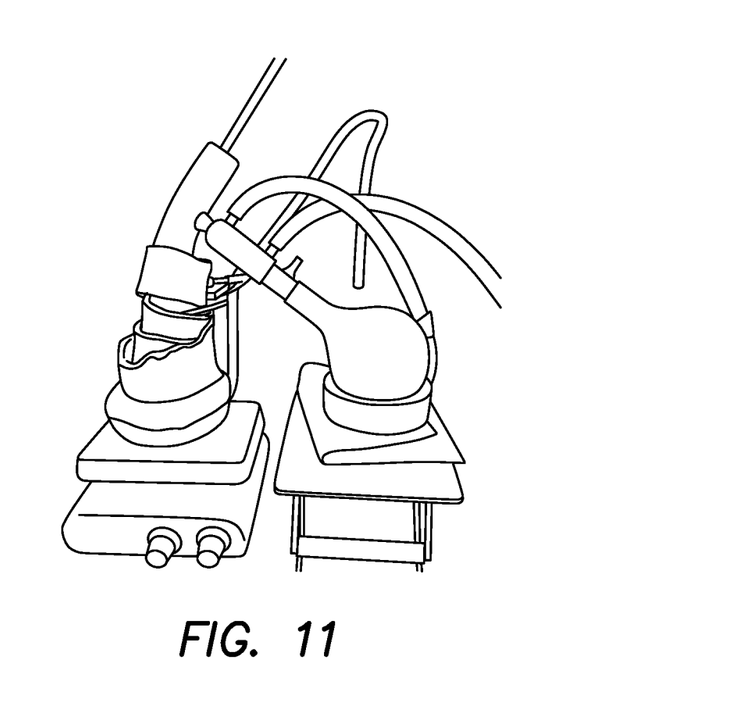
FIG. 11 is a photograph of the experimental distillation apparatus.
Figure 12:
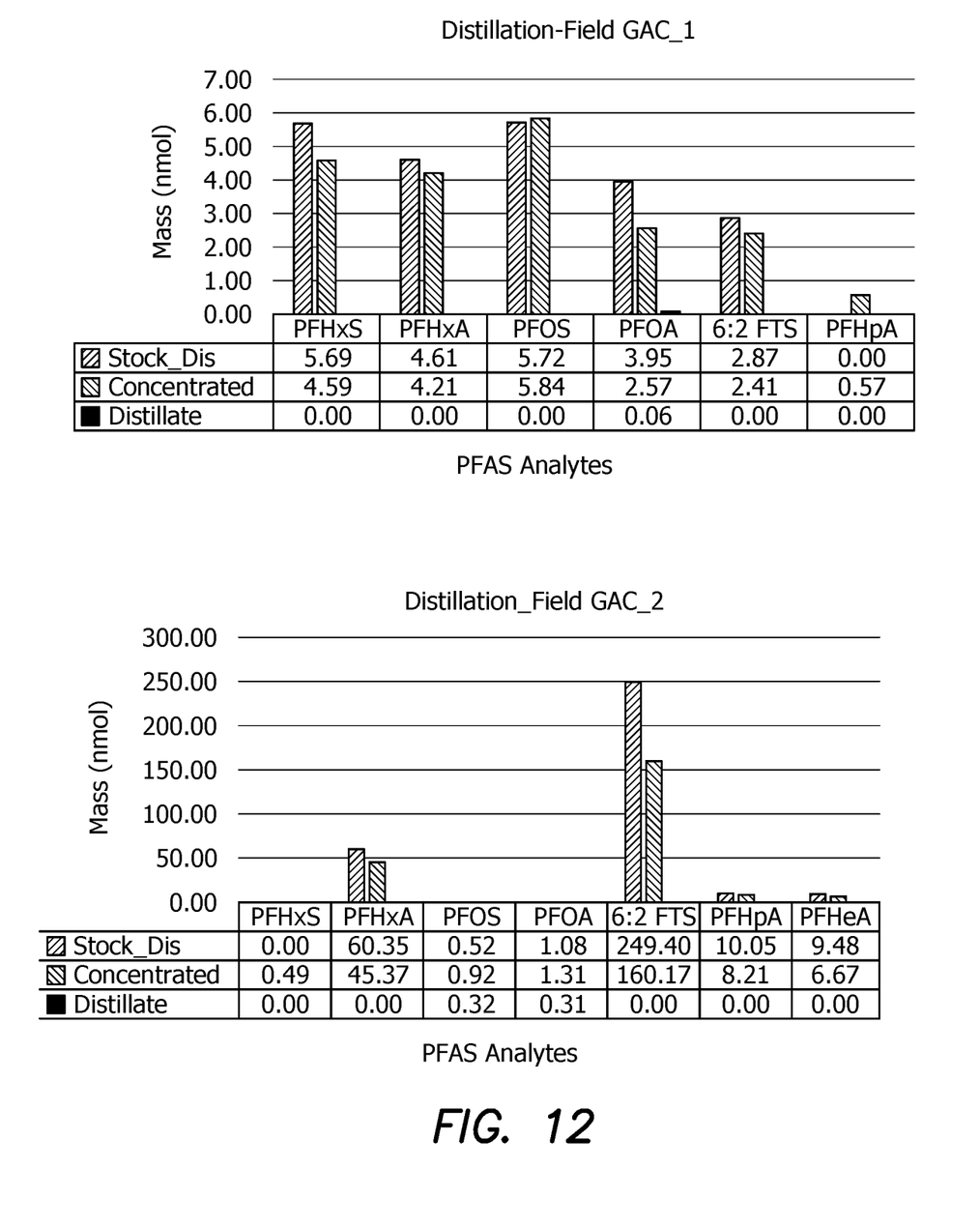
FIG. 12 shows distillation results from two sets of GAC recovered from the field.

Under the tested conditions, flow of PFOA and PFOS through either virgin or regenerated GAC showed essentially complete uptake (see Table 5). Quite surprisingly, as shown in FIG. 10 and Table 6, the regenerated activated carbon showed substantially superior PFOA and especially PFOS desorption. During the uptake experiment, 64 µmol PFOA and 41 µmol PFOS was loaded onto virgin GAC (2 replicate Columns A and B). After regeneration, approximately 5 µmol PFOA and 20 µmol PFOS remained on each column. Then 52 µmol PFOA and 32 µmol PFOS was loaded onto the same GAC remaining from the initial regeneration. Prior to regeneration, that GAC was extracted and Column B had only 26 µmol PFOA and 20 µmol PFOS measured. This result showed that less than half of the PFOA loaded was accounted for and that none of the PFOS loaded was accounted for; indicating an experimental error leading to an erroneous data point that is discarded. Thus, Column B only was included in the removal percentage for PFOA and PFOS in regenerated GAC (hence the lack of error bar).

TABLE 5

PFAS Uptake

| Aqueous Phase | Amount (µmol) | Amount Uptake (µmol) | % Uptake |
|---|---|---|---|
| Virgin GAC | | | |
| PFOA | | | |
| Stock | 64.32 | | |
| After Uptake_Column 1 | 0.0029 | 64.31 | 99.995% |
| After Uptake_Column 2 | 0.0012 | 64.31 | 99.998% |
| PFOS | | | |
| Stock | 41.19 | | |
| After Uptake_Col 1 | 0.0134 | 41.18 | 99.97% |
| After Uptake_Col 2 | 0.0069 | 41.19 | 99.98% |
| Regenerated GAC | | | |
| PFOS | | | |
| Slock | 64.32 | | |
| After Uptake_Column 1 | 0.0029 | 64.31 | 99.993% |
| After Uptake_Column 2 | 0.0012 | 64.31 | 99.998% |
| PFOS | | | |
| Stock | 41.19 | | |
| After Uptake_Col 1 | 0.0134 | 41.18 | 99.97% |
| After Uptake_Col 2 | 0.0069 | 41.19 | 99.98% |

TABLE 6

PFAS Desorption

| Solvent/ Additive System | Pre-Treatment GAC (µmol) | After-Treatment GAC (µmol) | Effluent (µmol) | After treat + Effluent (µmol) | Mass Balance |
|---|---|---|---|---|---|
| PFOA Virgin GAC | 68 | 4.9 | 100 | 105 | 148% |
| PFOS Virgin GAC | 50 | 21 | 36 | 57 | 115% |
| PFOA Regen GAC | 83 | 2 | 101 | 103 | 124% |
| PFOS Regen GAC | 77 | 7 | 57 | 64 | 83% |

Distillation Experiment

Procedure:

Distillation of the effluent solvent to concentrate the PFAS contaminated waste and recycle the solvent for future regeneration cycles is an important step maintaining the efficiency of the GAC regeneration process. To demonstrate the feasibility of the regenerant distillation and PFAS contaminated waste concentration (for ultimate disposal), a distillation experiment was performed using solvent effluent from two field GAC regenerated solvent (Ethanol+1% ammonium hydroxide). The PFAS containing regenerant was placed a distillation apparatus (heating mantle, reservoir flask, condenser, and distillate collection vessel) and heated to a boil maintained until the original volume has decreased to 10 percent or less of the starting volume. Samples were collected from the distillate and remaining PFAS-laden regenerant to determine if (and what) PFAS compounds may be susceptible to being distilled along with the solvent.

TABLE 7

Conditions of Distillation

| Conditions | Field GAC 1 | Filed GAC 2 |
|---|---|---|
| Distillation (overhead) Temperature | 69-75° C. | 70-72° C. |
| Time held for distillation | 2.5 hours | 3 hours |
| % Mass balance (weight of solvent-remaining and distilled) | 99.6 % | 99.2% |

Results
1. Detected PFAS analytes in the effluent were concentrated after the distillation process with minimal loss (concentration factors matched volume change and masses similar).
2. Minimal concentrations of PFAS chemicals in distillate solution.
3. Concentration of shorter chains (C5 and C6) suggest they are not being lost during distillation (raw data has a butyl (C4) that seemed to be concentrated (not shown below).
4. It is believed that the presence of a small amount of PFOS and PFOA would be eliminated by the use of a taller (more effective) distillation column. Table 8: Boiling points of the Chemicals and PFAS analytes

| Chemical and PFAS Analytes | Boiling Points | References |
|---|---|---|
| Ethanol | 78.2° C. | https://pubchem.ncbi.nlm.nih.gov/compound/Ethanol3section=Taste |
| Ammonium Hydroxide | 38° C. | https://pubchem.ncbi.nlm.nih.gov/compound/Ammonium-hydroxide#section=Taste |
| PFBS | 211.0° C. | https://pubchem.ncbi.nlm.nih.gov/compound/Perfluorobutanesulfonic-acid#section=Experimental-Properties |
| PFPeA | 140° C. | https://www.sigmaaldrich.com/catalog/product/aldrich/396575?lang=en&region=US |
| PFHxS | 345° C. | Systematic Review Protocol for the PFBA, PFHxA, PFHxS, PFNA, and, PFDA IRIS Assessments, October 2019, EPA/635/R-19/049 |
| PFHxA | 157° C. | Systematic Review Protocol for the PFBA, PFHxA, PFHxS, PFNA, and, PFDA IRIS Assessments, October 2019, EPA/635/R-19/049 |
| PFOS | 258-260° C. | EPA Technical fact sheet-PFOS and PFOA- November 2017, https://www.epa.gov/sites/production/files/2017-12/documents/ffrrofactsheet_contaminants_pfos_pfoa_11-20-17_508_0.pdf |
| PFOA | 192° C. | EPA Technical fact sheet-PFOS and PFOA- November 2017, https://www.epa.gov/sites/production/files/2017-12/documents/ffrrofactsheet_contaminants_pfos_pfoa_11-20-17_508_0.pdf |
| PFHpA | 177.82° C. | https://echa.europa.eu/documents/10162/22816069/1_cs_tables_pfaa_read-across_tables_1-8_en.pdf/5e5f7413f-a3d8-4bfa-9ce8-064f05023ba0 |

What is claimed:

1. A method of regenerating activated carbon contaminated by polyfluoroalkyl substances (PFAS) and/or perfluorooctane sulfonate (PFOS), comprising:
providing activated carbon having adsorbed polyfluoroalkyl substances (PFAS) and/or perfluorooctane sulfonate (PFOS);
contacting the activated carbon in a solution that comprises at least 50 mass % alcohol and at least 0.2 mass % of a base; and
separating the activated carbon from the solution.

2. A method of regenerating activated carbon contaminated by polyfluoroalkyl substances (PFAS) and/or perfluorooctane sulfonate (PFOS), comprising:
providing activated carbon having adsorbed polyfluoroalkyl substances (PFAS) and/or perfluorooctane sulfonate (PFOS);
contacting the activated carbon in a solution that comprises at least 50 mass % alcohol and at least 0.5 mass % of a base; and
separating the activated carbon from the solution.

3. The method of claim 1 further comprising rinsing the activated carbon that has been separated from the solution.

4. The method of claim 3 carried out in a batch process.

5. The method of claim 1 wherein the resulting activated carbon possesses about the same or superior adsorption of PFOS and/or PFOA (as measured by the sorption method in the Examples) as compared with the virgin activated carbon.

6. The method of claim 1 wherein the resulting activated carbon possesses superior adsorption of PFOS and/or PFOA (as measured by the sorption method in the Examples) as compared with the virgin activated carbon after exposure to PFAS for 2 days.

7. The method of claim 1 wherein the resulting activated carbon possesses superior desorption of PFOS and/or PFOA (as measured by the sorption method in the Examples) as compared with the virgin activated carbon.

8. The method of claim 1 wherein the resulting activated carbon possesses superior desorption of PFOS and/or PFOA (as measured by the sorption method in the Examples) as compared with the virgin activated carbon after exposure to PFAS for 2 days.

9. The method of claim 1 wherein the solution that is separated from the activated carbon is distilled to produce an alcohol solution that is recycled and used again regenerate activated carbon.

10. The method of claim 1 wherein the step of contacting comprises immersion, rinsing, and/or spraying.

11. The method of claim 1 wherein the step of contacting comprises rinsing at least 3 times with a volume of solution that is at least equal to the volume of activated carbon.

12. The method of claim 1 wherein the solution comprises at least 60, 70, 80, 90, or 95 mass % alcohol.

13. The method of claim 1 wherein the solution comprises at least 90 mass % alcohol and at least 0.5 mass % of NH4OH and wherein the alcohol is selected from ethanol, propanol and combinations thereof.

14. The method of claim 1 wherein the activated carbon is granulated activated carbon derived from coal.

15. The method of claim 1 wherein the activated carbon is granulated activated carbon that has been disposed underground and exposed to groundwater comprising PFAS.

16. The method of claim 1 wherein the regenerated activated carbon has at least 10% greater desorption of PFOA or PFOS (as measured by the sorption method in the Examples) as compared with virgin activated carbon.

17. The method of claim 1 wherein the activated carbon is regenerated in a flow of the alcohol and base solution.

18. The method of claim 1 wherein the step of contacting is conducted for at least 1 minute or at least 2 minutes, or at least 10 minutes, or at least 100 minutes, or 1 to 1000 minutes.

19. A system for regenerating activated carbon, comprising:
 a vessel comprising activated carbon having an inlet and an outlet, and the activated carbon having adsorbed polyfluoroalkyl substances (PFAS); and
 a distillation column connected to the outlet of the vessel; and
 wherein an alcohol solution comprising at least 0.2 mass % base is present in the system.

20. The system of claim 19 wherein the alcohol solution comprises at least 70 mass % alcohol and at least 0.5 mass % base.

* * * * *